United States Patent [19]

Belanger et al.

[11] Patent Number: 4,931,244

[45] Date of Patent: Jun. 5, 1990

[54] METHOD OF MAKING A UNIT NOZZLE HOUSING

[75] Inventors: James A. Belanger; Robert J. Wentworth, both of Northville; Barry S. Turner, Livonia; Graham J. Astley, Novi, all of Mich.

[73] Assignee: Belanger, Inc., Northville, Mich.

[21] Appl. No.: 268,413

[22] Filed: Nov. 8, 1988

Related U.S. Application Data

[62] Division of Ser. No. 45,356, May 4, 1987, Pat. No. 4,798,008.

[51] Int. Cl.⁵ ............................ B28B 1/48; B28B 1/02; B29C 41/20; B23P 19/04
[52] U.S. Cl. .................................. 264/154; 264/277; 264/310; 425/123; 425/435; 29/469
[58] Field of Search ............... 264/154, 277, 310, 311, 264/261; 134/22.18, 24; 29/460, 469, 527.1; 425/110, 123, 429, 435

[56] References Cited

U.S. PATENT DOCUMENTS

| | | | |
|---|---|---|---|
| 843,555 | 2/1907 | Weymar | 134/22.18 |
| 3,067,069 | 12/1962 | Stack | 134/22.18 |
| 3,860,018 | 1/1975 | Reiter | 134/22.18 |
| 4,143,193 | 3/1979 | Rees | 264/310 |

FOREIGN PATENT DOCUMENTS 3534756 4/1987 Fed. Rep. of Germany ... 134/22.18
3602209 7/1987 Fed. Rep. of Germany ... 134/22.18

Primary Examiner—Jeffery Thurlow
Assistant Examiner—Mathieu Vargot
Attorney, Agent, or Firm—Dykema Gossett

[57] ABSTRACT

A top air nozzle for blowing water off a washed moving vehicle in a car wash includes a unit nozzle housing of molded plastic material having an arcuate top wall, laterally diverging side walls, a pair of laterally spaced mount blocks, an upright rear wall, an upper front wall portion inclined downwardly and outwardly of the rear wall and terminating in a lower front wall portion inclined downwardly and inwardly toward the rear wall. The walls and wall portions define an air chamber of laterally increasing width from its top with the rear wall, lower front wall portion and side walls defining a laterally elongated throated air outlet. A plurality of spaced threaded insert fasteners arranged in a circle are molded, interlocked and enclosed within one of the upper front wall portion and rear wall. A plurality of spaced fasteners are arranged in a row, are molded, interlocked and enclosed within each mount block. The wall or wall portion mounting the first fasteners is adapted to have an opening cut therein inwardly of the fasteners to receive a pressurized air inlet.

1 Claim, 2 Drawing Sheets

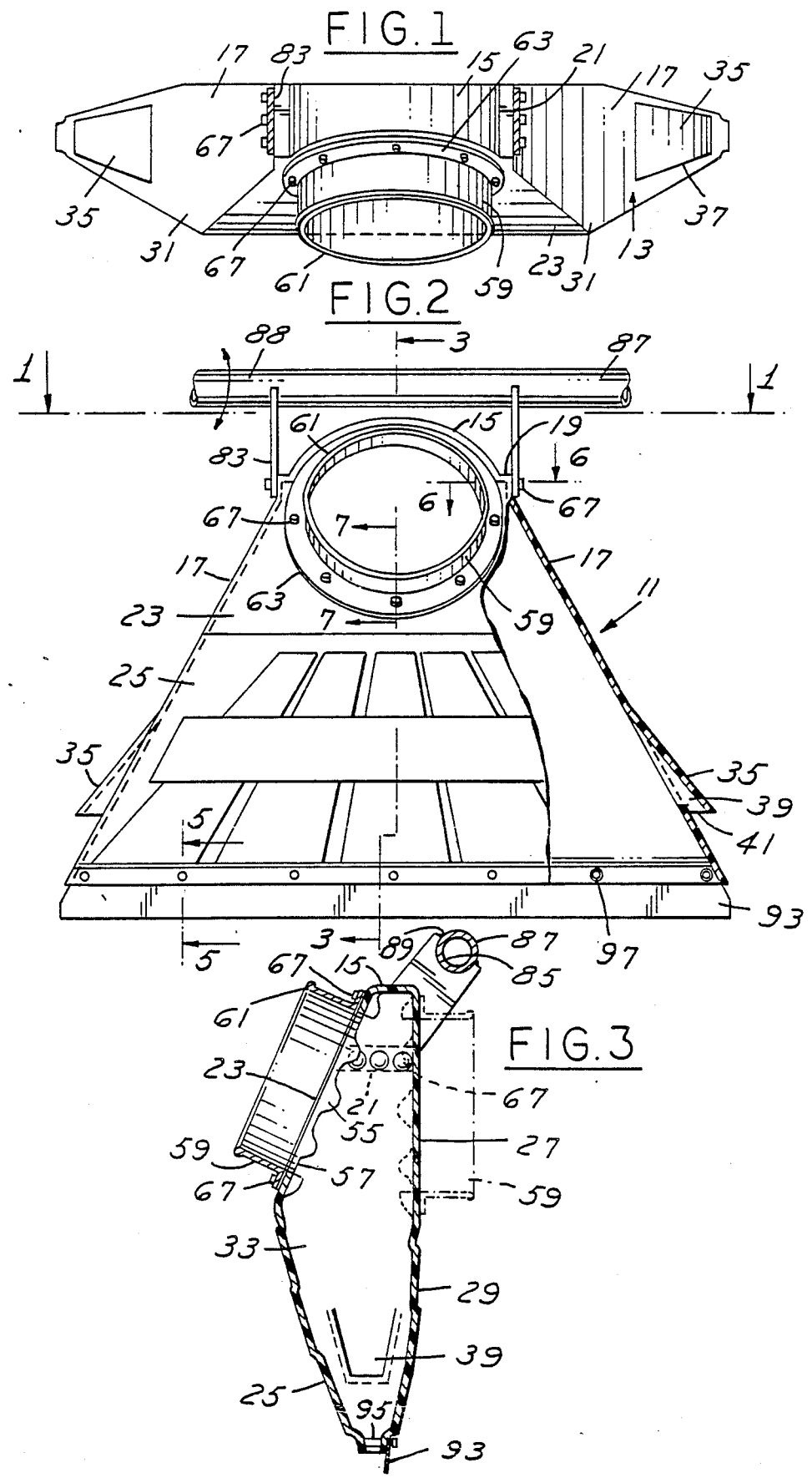

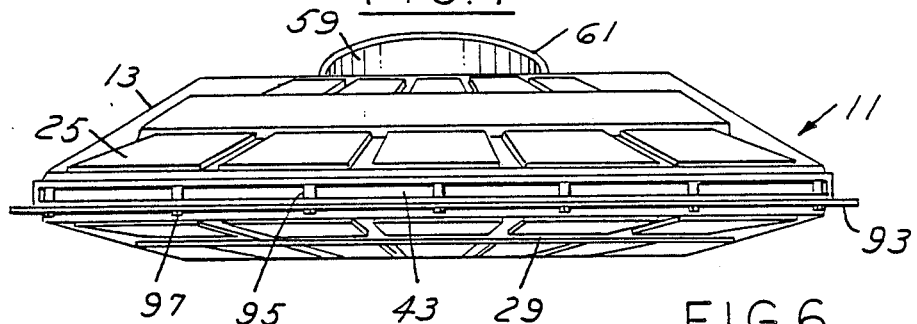
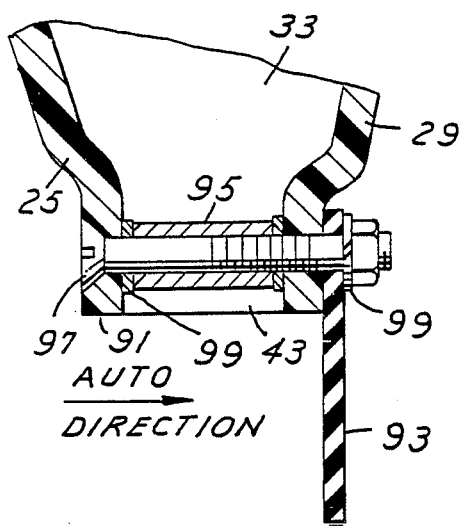
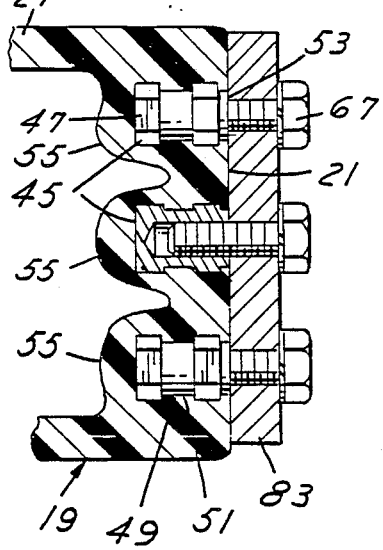
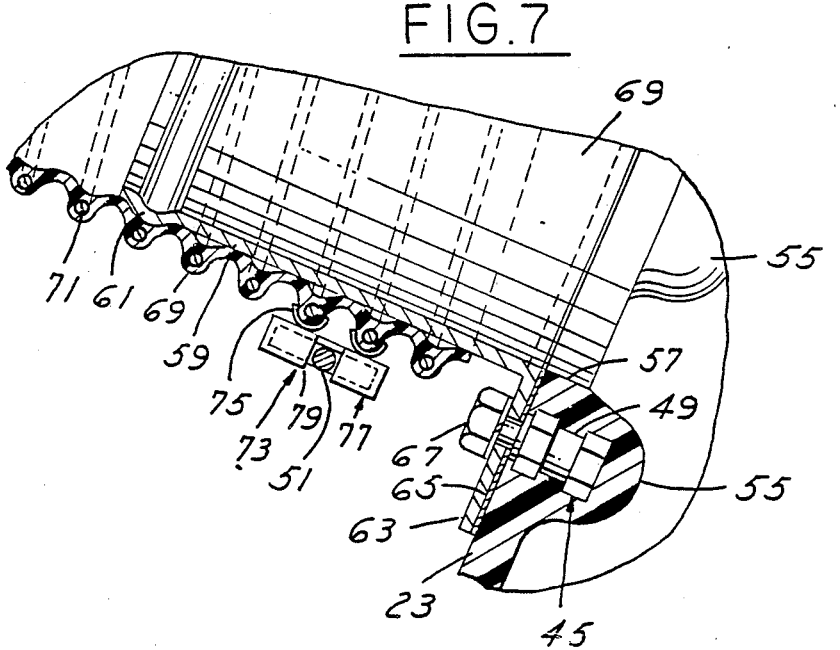

METHOD OF MAKING A UNIT NOZZLE HOUSING

This is a divisional of co-pending application Ser. No. 07/045,356 filed May 4, 1987, now U.S. Pat. No. 4,798,008.

FIELD OF THE INVENTION

The present invention relates to a nozzle construction or air nozzle and more particularly to a unit nozzle housing of molded plastic material having an air chamber at one end terminating in a throated outlet and at its other end an inlet adapted to receive a pressurized air hose.

BACKGROUND OF THE INVENTION

Previously air nozzle housings having a throated outlet have been formed of metal. Attached to the housing was a separate inlet fitting connectable to an air hose. Due to interrupted wall interiors, interior constructions including fasteners, the flow of air under pressure through the outlet has been turbulent, noisy and inefficient.

There have been difficulties in securing and retaining a flexible air hose over the inlet of the nozzle housing. There have also been difficulties in mounting an air inlet upon and around an opening in the air nozzle housing and in efficiently securing the air inlet in position thereon.

Problems have also been encountered in adjustably supporting a top air nozzle on a framework transverse of the path of movement of a washed vehicle moving thereunder in a car wash. There have been difficulties in adjusting the angle of tilt or attack of a nozzle for an efficient blowing of water off of the washed vehicle. Previously air nozzle housings have engaged and scratched the body of a moving vehicle due to the difficulty of elevating the air nozzle housing to a vehicle clearance position as the vehicle passes thereunder.

SUMMARY OF THE INVENTION

An important feature of the present invention is to provide a top air nozzle adapted for blowing water off a washed moving vehicle in a car wash comprising a unit nozzle housing of molded plastic material which includes an arcuate top wall, laterally diverging side walls, a pair of laterally spaced mount blocks, a substantially upright rear wall, an upper front wall portion inclined downwardly and outwardly of the rear wall and a lower front wall portion inclined downwardly and inwardly toward the rear wall. The walls and wall portions define an air chamber of laterally increasing width from its top. The side walls, the lower wall portion and rear wall define a laterally elongated throated air outlet.

Another feature is to provide a unit nozzle housing of molded plastic material and within one of the top wall portion and rear wall there are selectively molded and retained in a circle a series of spaced insert fasteners enclosed therein.

Still another feature is to provide within the mold used in making the housing a series of additional insert fasteners arranged in rows which in the unit molded article are mounted, enclosed and secured within the mount blocks of the nozzle housing and enclosed therein. This provides an effective means for mounting and supporting the unit nozzle housing upon a frame work.

Another feature, after the housing is removed from the mold, is to cut a circular inlet opening within the wall or wall portion containing the series of spaced fasteners arranged in a circle, and inwardly thereof with the opening communicating with the internal chamber of the nozzle housing. An air inlet surrounds the inlet opening and is secured to the wall or wall portion.

A further feature is to provide an air inlet sleeve having an apertured annular mount flange which overlies and is secured to one of the upper front wall portion and rear wall around the opening cut therein adapted to receive a flexible hose connected to a pressurized air source.

A still further feature includes an annular bead adjacent one end of the air inlet. An elongated flexible hose of corrugated form at one end snugly overlies the inlet, is interlocked with the bead against relative longitudinal movement and is clamped thereon.

Another feature is to provide a unit nozzle housing an improved clamp means which extends around and compressively engages the hose and the inlet for securing the hose over the inlet for delivery for pressurized air into the chamber within the nozzle housing.

It is still another feature to provide a pair of laterally spaced clamp straps apertured at their one ends to receive fasteners for securing to the mount block fasteners of the nozzle housing, with the other ends of the clamp straps connected to a transverse vertical lift rod. The top air nozzle and unit nozzle housing is mounted upon a framework for positioning transversely of the path of movement of a washed vehicle moving thereunder. The nozzle housing is adapted for angular adjustment of the angle of attack of pressurized air streams delivered through its throated air outlet. It is further adapted for vertical adjustments for clearance with respect to the washed vehicle passing thereunder.

Another important feature is to provide a vertical support means for the rod which supports the top unit nozzle housing which is capable of rotary adjustment and vertical adjustment with respect to a frame work.

It is still another feature to provide along and depending from the throated outlet of the unit nozzle housing an elongated air directional flap of resilient material which depends below the throated outlet for directing pressurized air against the direction of movement of a washed vehicle moving thereunder.

Another important feature is to provide upon the outwardly diverging side walls of the housing towards the lower ends thereof a pair of outwardly and downwardly inclined hooded outlets in communication with the interior air chamber of the nozzle housing adapted to feed streams of pressurized air in a pattern laterally outward of the air stream from the elongated throated outlet of the housing for blowing air onto a washed vehicle which is wider than some vehicles thereby increasing the lateral air pattern of the nozzle.

It is still another feature of the present invention to provide in conjunction with the respective walls which define the unit nozzle housing interior radiused corners and smooth blending convexed embossments upon the interior walls overlying the respective molded insert fasteners to assure a smooth, nonturbulent efficient air flow passing through the nozzle housing and through the throated outlet and lateral outlets therein.

A further important feature of the invention is the method of making a unit air nozzle housing of molded plastic material having a laterally elongated throated air outlet which comprises the steps: (a) of taking a two piece mold which when closed has an internal cavity corresponding to the outer configuration of the unit nozzle housing; (b) placing powdered or granular plastic in the cavity of the open mold in an amount sufficient to form the air nozzle housing; (c) closing the mold and bolting it together; (d) moving the closed mold into a heated oven while rotationally rotating the mold to melt the plastic and thereby fill the cavity with liquid plastic material and to form the unit nozzle housing with an elongated throated air outlet; (e) removing the heated mold from the oven and permitting the mold to cool either by air or by water to solidify the nozzle housing; and (f) removing the solidified plastic housing from the mold.

Still another feature includes the step of inserting into the mold prior to its rotation a plurality of spaced insert fasteners whereby the fasteners are permanently embedded, enclosed within and anchored selectively within one of the front wall portion and rear wall of the unit molded housing and within the mount blocks thereon.

A further feature of the present method includes a step of selectively molding the fasteners into one of the walls of the molded housing and after removing the housing from the mold, cutting a circular opening through the wall containing the fasteners and inwardly thereof.

These and other objects and features will be seen from the following specification and claims in conjunction with the appended drawings.

THE DRAWINGS

FIG. 1 is a top plan view of the present unit nozzle housing taken in the direction of arrows 1—1 of FIG. 2.

FIG. 2 is a front elevational view thereof.

FIG. 3 is a section taken in the direction of arrows 3—3 of FIG. 2.

FIG. 4 is a bottom perspective view of the unit nozzle housing shown in FIGS. 1 and 2.

FIG. 5 is a transverse section taken in the direction of arrows 5—5 of FIG. 2, on an enlarged scale.

FIG. 6 is a fragmentary plan section taken in the direction of arrows 6—6 of FIG. 2, on an enlarged scale.

FIG. 7 is a fragmentary section taken in the direction of arrows 7—7 of FIG. 2, on an increased scale, with an air hose fragmentarily shown.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings, a top air nozzle assembly or nozzle construction is generally indicated at 11 in one embodiment of the invention adapted for blowing water off of a washed moving vehicle in a car wash for illustration. The top air nozzle includes a unit nozzle housing 13 of molded plastic material as for example, a high molecular weight polyethylene which is rotationally molded within a mold to produce the unit molded nozzle shown in FIGS. 1, 2 and 4. The present unit molded nozzle housing 13 includes an arcuate top wall 15, laterally divergent side walls 17 and intermediate right angular mount blocks 19 provided with side faces 21.

The unit molded nozzle housing 13 further includes upper front wall portion 23 which is inclined downwardly and outwardly at a 30° angle, approximately, with respect to the generally upright rear wall 27. Upper front wall portion 23 terminates in the lower front wall portion 25 which is inclined downwardly and inwardly towards rear wall 27 at an angle of 30°, approximately, with the rear wall 27 at its lower end converging inwardly at 29, FIG. 3. The nozzle housing 13 has a thickness of 3/8", approximately.

The respective top wall 15, side walls 17, front wall portions 23 and 25, rear wall 27 and rear wall converging portion 29 define an air chamber 33 which terminates in the laterally elongated throated air outlet or orifice 43. As shown in FIG. 2, air chamber 33 diverges laterally from top to bottom and converges downwardly terminating in the laterally elongated throated air outlet 43. In view of the inclination of the respective upper front wall portion 23 and lower front wall portion 25 corresponding portions of the divergent side walls 17, FIG. 1, are laterally enlarged at 31 or tapered outwardly to match the tapered front wall portions 23, 25.

Mounted upon the respective diverging side walls 17 adjacent their lower ends are the opposed outwardly inclined hoods 35 which are downwardly converging at 37, FIG. 1, and include corresponding side walls 39 to define a pair of throated pressure air outlets 41 which are in communication with air chamber 33.

The respective outlets 41 and the laterally elongated air outlet 43 are initially molded closed when removed from the rotational mold and are thereafter cut or routed out to define corresponding air outlets or orifices 41 in hoods 35 and the laterally elongated air outlet 43 at the lower end of the unit molded nozzle housing 13.

In this illustrative embodiment, a plurality of spaced insert fasteners 45 are arranged in a circle in the rotational mold before molding of the unit nozzle housing 13. When the molded unit nozzle housing 13 is removed from the mold the corresponding insert fasteners 45 are nested, enclosed and anchored within the corresponding wall as for example, front wall portion 23. Selectively the fasteners 45 may be molded into the rear wall, as shown in dash lines, when the inlet 59 is to be mounted thereon.

The fasteners 45 are of polygonal shape such as hexagonal at 47, FIG. 6, and in the molded article are relatively non-rotatable with respect to the unit nozzle housing 13 within which they are enclosed. The respective fasteners 45 have an annular recess 49 intermediate their ends to thereby provide within the molded article a plastic interlock at 51 which secures the fasteners 45 against relative longitudinal movement with respect to the unit molded housing 13. In the illustrative embodiment, outer end portions of the corresponding fasteners 45 are flush with the corresponding outer wall or wall portion of a housing as at 53.

Upon the interior surface portion of the wall within which the fasteners are enclosed, as for example the upper wall portion 23, corresponding to the respective fasteners 45 there are smooth convex interior embossments 55 which blend with the interior wall surface of the wall or wall portion. The embossments 55 in cooperation with the interior radiused corners 22, FIG. 3, between the respective interior walls and wall portions provide for an efficient noiseless flow of pressurized air without turbulence from air chamber 33 and out through the elongated throated outlet 43 and the corresponding hooded outlets 41, FIGS. 2 and 3. In the illustrative embodiment the unit molded housing 13 of FIGS. 3 and 5 is arranged transversely of the direction of movement of a vehicle being washed within a car wash, not shown, yet schematically indicated by the arrow in FIG. 5. The nozzle housing 13 is in the path of the forward end of the vehicle.

The present unit nozzle housing 13 is also in use positioned adjacent the rear portion of the vehicle, and may be at a different angle attack relative to the vehicle as it moves away from such second unit nozzle housing. It may be desirable to mount air inlet 59 upon rear wall 27, as shown in dash lines FIG. 3.

In the illustrative embodiment, FIG. 3, after the molded article has been removed from the rotational mold an air inlet opening 57 is routed or cut out of front wall portion 23 inwardly of the corresponding insert fasteners 45 provided in that wall. Conversely and selectively in the event that the spaced fasteners 45 are molded within rear wall 27 the fasteners will be molded and retained within such rear wall and enclosed by interior embossments 55 shown in dash lines. The circular opening 57 would then by cut in the rear wall 27 inwardly of the circle of fasteners 45.

Air inlet sleeve 59 has at one end an annular bead 61 and at its opposite end an apertured circular mount flange 63 which is positionable over upper front wall portion 23 in registery with embedded fasteners 45 and with a suitable gasket 65 of flexible material, FIG. 7, interposed therebetween and secured in position by a plurality of fasteners 67. A lock washer 68 is provided between each fastener 67 and the flange 63.

In the illustrative embodiment, air inlet 59 is adapted to receive thereover corrugated flexible hose 69, fragmentarily shown in FIG. 7, preferably constructed of urethane or other suitable plastic material including a reinforcing wire 71 within corresponding spiral corrugations 69. The corrugated flexible hose 69 is positioned over and interlocked with annular bead 61 upon inlet 59 and is further anchored and secured upon the inlet by a clamp assembly 73.

The clamp assembly 73 includes an elongated flexible channel 75 which fits over one of the annular corrugations of hose 69 and a portion of an adjacent corrugation. The respective ends of the channel 75 are laterally overlapped.

A pair of the clamp straps 77, one of which is shown in FIG. 7, loosely overlie the respective overlapped ends of channel 75 and are respectively affixed as by welding to adjacent intermediate portions of the channel of each of the overlapped ends. Each of the clamp straps includes a loop portion 79. T-shaped fasteners 81 interconnect the clamp straps 77 and when tightened by a fastener, draw up the adjacent intermediate portions of the clamp channel and extend the overlap of the respective ends for snugly anchoring flexible hose 69 over inlet 59.

Referring to FIGS. 2 and 6 in the rotational molding of the corresponding fasteners 45 within the unit molded nozzle housing 13 there will be a series of fasteners 45 arranged in a row, nested, retained and enclosed within the corresponding mount blocks 19, flush with the corresponding side faces 21 thereof.

A pair of laterally spaced generally upright clamp straps 83 have a series of transverse apertures at one end adapted to receive fasteners 67 which project into the mount block fasteners 45. Upper ends of straps 83 are recessed at 85, FIG. 3, extend over undersurface portions of transverse vertical lift rod 87 and are suitably secured thereto by welds 89. FIG. 2 illustrates an efficient and effective means of supporting and suspending the unit nozzle housing 13 in a transverse position relative to the path of movement of a washed vehicle moving thereunder as shown in FIG. 5.

In normal operation the present unit nozzle housing 13 is adapted for directing streams of pressurized air through the laterally elongated throated air outlet 43 and through the lateral outlets 41, FIGS. 2 and 3. It is desirable that housing 13 be inclined toward the moving vehicle at an appropriate angle of attack with respect to movement of the vehicle, as for example, 30° for respect to a normal.

For this purpose, the vertical lift rod 87, fragmentarily shown, in FIG. 2 is rotatively mounted at its ends within the vertically adjustable support means or sleeves upon upright rails, as a part of the framework. By this construction, and as shown at 88 vertical lift rod 87 is adapted for limited rotary adjustments for determining the angle of attack or inclination of unit nozzle housing 13 relative to the vehicle moving thereunder.

The vertical adjustment of the support means 90 provides a means by which the vertical lift rod 87 may be vertically adjusted by remote control so that the unit nozzle housing 13 at all times overlies the vehicle moving thereunder and remains out of control therewith while closely adjacent thereto.

The present top air nozzle assembly 11 including the unit nozzle housing 13 is adapted for pivotal angular movements up to 30° from an upright position approximately. At the same time the corresponding vertical lift rod is adapted for vertical adjustments for affecting corresponding vertical adjustments of the unit nozzle housing.

As shown in FIGS. 2, 3 and 5 the throated air orifice or outlet 43 is defined by a pair opposed transversely apertured wall elements 91 at the lower ends of the corresponding front wall portion 25 and rear wall 29. An elongated flap 93 of rubber or other flexible material, such as a suitable plastic material is suitably apertured, and depends from one of the wall elements 91, such as the wall element furthest away from the vehicle moving in the direction designated by the arrow in FIG. 5.

A series of laterally spaced spacers 95, FIGS. 4 and 5, are interposed between the corresponding wall elements 91 which define the throated outlet 43. A corresponding plurality of flat head bolt fasteners 97 project through apertures in wall elements 91, through spacers 95 and are suitably secured to flap 93 with suitable washers 99 interposed. The flap 93 depends in a substantially upright position. In operation of the present unit nozzle housing 13 directing pressurized air through the laterally elongated throated outlet 43, the rubber flap 93 functions to partly deflect the downwardly moving air towards the oncoming washed vehicle moving thereunder, FIG. 5.

In the illustrative embodiment, FIG. 3, front wall portion 23 is inclined at approximately 30° with respect to rear wall 27 so that the included angle between these walls is approximately 30°. Pressurized air is directed through air inlet 59 shown in solid lines, or selectively through the other air inlet shown in dash lines.

Similarly, the lower front wall portion 25 and corresponding rear wall 27 including rear wall element 29 are similarly inclined toward each other at an angle of approximately 30°, more or less, for increased velocity of flow of pressurized air through and along the transversely elongated orifice or air outlet 43. Additional pressurized air is jetted through the laterally arranged hood outlets 41 for blowing water off vehicles of increased width moving thereunder.

The present invention is primarily directed to a top air nozzle construction including a unit nozzle housing 13 of molded plastic material such as shown in FIGS. 1–7. The invention is furthermore directed to a method of molding the present top air nozzle which comprises the following steps:

(a) taking a two piece mold which when closed has an internal cavity corresponding to the outer configuration of the unit nozzle housing;

(b) placing powdered or granular plastic in the cavity of the open mold in an amount sufficient to form the unit nozzle housing;

(c) closing the mold and bolting it together;

(d) moving the closed mold into a heated oven while rotationally rotating the mold to melt the plastic and distribute and fill the cavity with liquid plastic material and to thereby form the unit nozzle housing with the laterally elongated throated air outlet;

(e) removing the heated mold from the oven and permitting the mold to coole either by air or by water to solidify the plastic nozzle housing; and (f) removing the solified plastic nozzle housing from the mold.

The method includes the further step of inserting into the mold prior to closing and rotation a plurality of spaced insert fastener 45 whereby the fasteners are permanently embedded, enclosed selectively within one of the upper front wall portion and rear wall of the unit molded housing, and within the mount blocks provided thereon.

In the method defined herein fasteners 45 are arranged in a circle and there is the further step of:

(a) removing the housing from the mold and then routing a circular opening 57 in one of the walls of the housing corresponding to the wall within which the fasteners 45 are anchored, inwardly of the fasteners providing an air inlet opening. The mount flange of pressure air inlet 59 adapted to receive flexible air conduit 69 is mounted upon the wall in communication with opening 57.

The method include others steps after the nozzle housing is removed from the mold including:

(a) cutting an elongated opening in the normally closed throated air outlet 43; and (b) cutting the elongated openings in the normally closed air outlets 41 located in the inclined hoods 35.

In the illustrative embodiment the preferred plastic material is a high molecular weight polyethylene which has high lubricity despite the fact that it will cold flow. Any suitable plastic material may be employed which is tough in resistance to damage, impervious to temperature changes, inexpensive, impervious to mold chemicals including cleaning agents and easy to keep clean, durable and long lasting. The present method and mold construction provides for consistent velocity at the ends of the corresponding nozzles 43 and 41 providing a smooth uninterrupted flow of pressurized air at uniform velocity and substantially noiseless.

Having described our invention, reference should now be had to the following claims:

We claim:

1. The method of making a pressurized unit nozzle housing of molded plastic material comprising the steps of:

(a) taking a mold which when closed has an interior cavity corresponding to the outer configuration of the unit molded nozzle housing;

(b) placing powdered or granular plastic material into said mold when open;

(c) inserting a plurality of spaced insert fasteners into the mold and closing the mold;

(d) subjecting the mold to heat to melt the plastic while rotating said mold to fill said cavity with the plastic melted material;

(e) cooling the mold to solidify the plastic and to thereby form a unit nozzle housing having a laterally elongated normally closed throated air outlet, whereby the fasteners are permanently embedded, enclosed within and anchored selectively within one of the front and rear walls of the unit molded nozzle housing;

(f) removing the molded nozzle housing from the mold, forming an opening by cutting a circular opening in one of the front and rear walls inwardly of the fasteners and cutting an elongate opening in the throated air outlet; and (g) connecting a source of pressurized air to the circular opening, the fasteners being used to secure the source of pressurized air to the circular opening thus pressurizing the nozzle housing.

* * * * *